(12) United States Patent
Yoon (10) Patent No.: US 7,302,826 B2
(45) Date of Patent: Dec. 4, 2007

(54) SHOCK WAVEFORM SYNTHESIS METHODS FOR SHOCK RESPONSE SPECTRUM OVER SHORT TIME INTERVAL, DIGITAL FILTER FOR OBTAINING SHOCK RESPONSE HISTORY AND INVERSE FILTER THEREOF

(75) Inventor: Eul-Jae Yoon, Daejeon (KR)

(73) Assignee: Agency For Defense Development, Daejeon (KR)

( * ) Notice: Subject to any disclaimer, the term of this patent is extended or adjusted under 35 U.S.C. 154(b) by 116 days.

(21) Appl. No.: 11/158,219

(22) Filed: Jun. 21, 2005

(65) Prior Publication Data

US 2006/0096352 A1 May 11, 2006

(30) Foreign Application Priority Data

Nov. 5, 2004 (KR) ...................... 10-2004-0089919

(51) Int. Cl.
*G01M 7/00* (2006.01)
*G01M 7/08* (2006.01)
(52) U.S. Cl. ..................................................... 73/12.01
(58) Field of Classification Search ............... 73/11.04, 73/12.01
See application file for complete search history.

(56) References Cited

OTHER PUBLICATIONS

Szczupak, J.; Brandolino, M.V.; Circuits and Systems, 1990., IEEE International Symposium on May 1-3, 1990 pp. 549-552 vol. 1 Digital Object Identifier 10.1109/ISCAS.1990.112115. Accessed online Dec. 11, 2006 at http://ieeexplore.ieee.org/iel5/143/3356/00112115.pdf?arnumber=112115.*
Kock, D.B.; Southeastcon '89. Proceedings. 'Energy and Information Technologies in the Southeast'., IEEE. Apr. 9-12, 1989 pp. 860-865 vol. 2 Digital Object Identifier 10.1109/SECON.1989.132521. Accessed online Dec. 11, 2006 at http://ieeexplore.ieee.org/iel2/804/3643/00132521.pdf?arnumber=132521.*
Markel, J.;. Audio and Electroacoustics, IEEE Transactions onvol. 20, Issue 2, Jun. 1972 pp. 129-137 Accessed online Dec. 11, 2006 at http://ieeexplore.ieee.org/iel6/8337/26091/01162367.pdf.*
Harris C.M.; Piersol, A.G. (2002). Harris' Shock and Vibration Handbook (5th Edition), McGraw-Hill. p. 1.25. Online version available at: http://www.knovel.com/knovel2/Toc.jsp?BookID=625&Vertical1D=0. Accessed on Dec. 6, 2006.*
Jenkins, W.; Leon, B;Circuits and Systems, IEEE Transactions on vol. 22, Issue 3, Mar. 1975 pp. 223-232. Online version available at: http://ieeexplore.ieee.org/iel5/31/23442/01084032.pdf?tp=&arnumber=1084032&isnumber=23442 Accessed on Dec. 11, 2006.*

(Continued)

*Primary Examiner*—Michael Cygan
*Assistant Examiner*—Punam Patel
(74) *Attorney, Agent, or Firm*—Brooks Kushman P.C.

(57) ABSTRACT

Provided are shock waveform synthesis methods for a shock response spectrum over a short time interval, which are used for a shock response spectrum test. For the purpose, the shock response spectrum test is performed by including the steps of: obtaining each time $\tau_k$ (k=1, 2, . . . , M) at which a maximax value is detected in the response history due to a zero delay wavelet input, wherein a natural frequency of the SDOF system with a Q (quality factor) of 10 equals to the wavelet frequency of the zero delay wavelet input; and establishing each delay time $\delta_k$ as $\delta_k = \tau_1 - \tau_k$ (k=1, 2, . . . , M).

5 Claims, 9 Drawing Sheets

OTHER PUBLICATIONS

LASERUSB Shaker Control System Featuring USB 2.0 Connectivity: Technical Specifications. Copyright 200 LDS, SCSTS 1203. Accessed on May 15, 2007. <http://www.scanditest.no/se/pdf6/LASERusb_Technical_Specifications.pdf>.*

Article entitled "Department of Defense Test Method Standard for Environmental Engineering Considerations and Laboratory Tets", MIL-STD 810-F, Jan. 1, 200, Method 517—Pyroshock, pp. 517.1-517.24.*

Article entitled "Random Vibration in Perspective" by Wayne Tustin and Robert Mercado—Tustin Institute of Technology, Santa Barbara, California, 1984, Section 33 (Shock Testing), pp. 175-184.

Article entitled "Department of Defense Test Method Standard for Environmental Engineering Considerations and Laboratory Tests", MIL-STD 810F, Jan. 1, 2000, Method 516.5—Shock, pp. 516.5-1 thru 516.5-16.

* cited by examiner

SHOCK WAVEFORM SYNTHESIS METHODS FOR SHOCK RESPONSE SPECTRUM OVER SHORT TIME INTERVAL, DIGITAL FILTER FOR OBTAINING SHOCK RESPONSE HISTORY AND INVERSE FILTER THEREOF

BACKGROUND OF THE INVENTION

1. Field of the Invention

The present invention relates to shock waveform synthesis methods which are used for a shock response spectrum test, and particularly, to shock waveform synthesis methods for a shock response spectrum over a short time interval.

2. Description of the Conventional Art

Shock tests in environmental test are performed to evaluate an influence on a physical or functional performance of a test specimen to be exposed to shocks in its lifetime. The shock tests may be classified into classical shock tests such as half-sine, sawtooth, or the like specifying types of waveforms, and shock response spectrum tests which do not specify the types of waveforms and can advantageously achieve uniform results therefrom.

A shock response spectrum (hereinafter SRS) is a plot of the peak responses of a series of single degree of freedom (hereinafter SDOF) systems to an input transient. Here, the peak response indicates a maximax in the response history. There may theoretically be many types of waveforms satisfying the shock response spectrum which is required for specifications of the shock response spectrum test. The shock response spectrum test uses a shaker.

Figure 1:
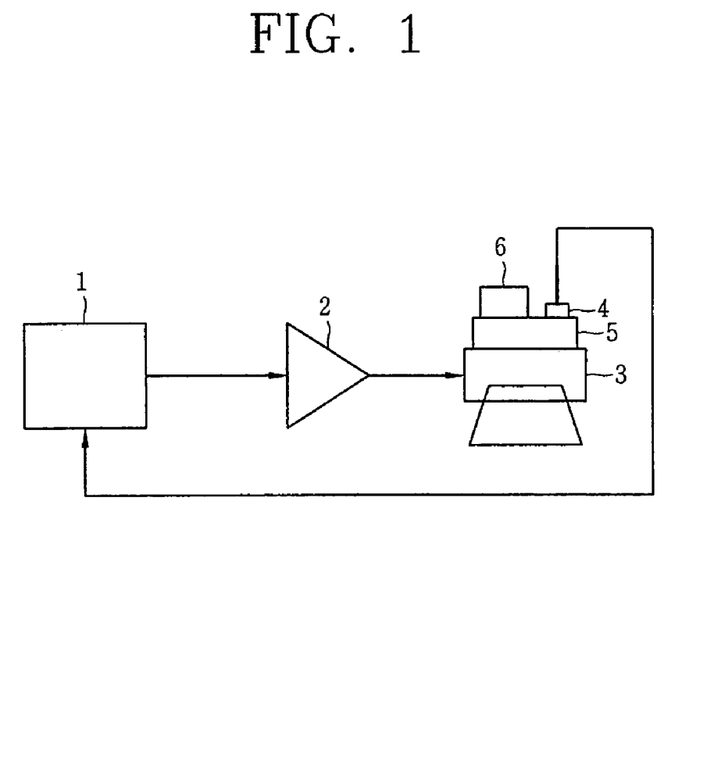
FIG. 1 is a schematic block diagram of a shaker system for performing a shock response spectrum test.

FIG. 1 is a schematic block diagram of a shaker system for performing the shock response spectrum test.

Referring to FIG. 1, the shaker system comprises a control system 1 and a power amplifier 2. A fixture 5 is placed between the shaker 3 and a test specimen 6, and an accelerometer 4 is mounted at a position at which the test specimen 6 is coupled to the fixture 5.

In general, mechanical shock applied to the test specimen 6 will cause the test specimen 6 to respond to (a) forced frequencies imposed on the test specimen 6 by the excitation, and (b) resonant natural frequencies of the test specimen either during or after application of the excitation. Such response may cause the failure of the test specimen 6 as a result of increased or decreased friction between parts, or general interference between parts, etc. There are various types of waveforms satisfying the shock response spectrum given by the shock response spectrum test. However, in MIL-STD-810F (which has been revised from MIL-STD-810E in January, 2000), a new effective shock duration $T_e$ is defined and certain conditions are required. Depending on the certain conditions, the shock response spectrum should be satisfied, the determined effective shock duration should be kept, and some compromise may be necessary on the condition of a waveform which can not satisfy the determined effective shock duration, namely, a waveform the duration of which is 20% longer than the effective shock duration. In other words, first, if the test specimen has no significant low frequency modal response, it is permissible to allow the low frequency portion of the SRS to fall out of tolerance, provided the high frequency portion begins at least one octave below the first natural mode frequency of the test item. In this case, the duration should be satisfied. Secondly, if the test specimen has significant low frequency modal response, it is permissible to allow the duration of the transient pulse to fall out of tolerance, provided the duration of the transient pulse does not exceed $$T_e + \frac{1}{2f_{\min}}$$

(here, $f_{\min}$ is the lowest frequency in the SRS analysis). Moreover, if the duration of the transient pulse must exceed $$T_e + \frac{1}{2f_{\min}}$$

in order to have the low frequency portion of the SRS within tolerance, a new shock procedure must be used. The effective shock duration can be considered as requisite to perform a sufficient test for interference between parts. However, because the conventional waveform synthesis methods have not satisfied the requirements of the determined effective shock duration, namely, because of the required waveform which has a duration much longer than the determined effective shock duration, it is disadvantageously impossible to test for damage or malfunction which may be caused by the interference between parts.

Furthermore, in the existing method for calculating a shock response time history in the single degree of freedom system by using a digital filter algorithm, there is no problem to calculate the shock response time history in the single degree of freedom system, provided that the sampling frequency is much higher than the natural frequency to be analyzed. However, its inverse applications to filter off the unwanted transient have been demonstrated not to be feasible because of instability problems.

Moreover, in the classic sawtooth or half-sine shock test which have pre-load and post-load pulses, there is no way to easily reduce peak velocities or peak displacements. As a result, it is impossible to perform the test in case of exceeding the shaker limits.

SUMMARY OF THE INVENTION

Therefore, it is an object of the present invention to provide shock waveform synthesis methods for a shock response spectrum over a short time interval by which interference between parts within a test specimen is increased to perform a sufficient shock test for damage or malfunction which may be caused by the interference between parts, and a unit pulse digital filter for obtaining a shock response time history required for the shock waveform synthesis and a unit pulse digital inverse filter for filtering off unwanted transients by inversely using the unit pulse digital filter. Another object is embodied in the present invention, that is to provide shock waveform synthesis methods by which peak velocities or peak displacements are easily reduced with additional conditions, in case that peak velocities or peak displacements of classical shock waveforms in which pre-load and post-load areas are added in the classic shock test exceed shaker limits.

To achieve these and other advantages and in accordance with the purpose of the present invention, as embodied and broadly described herein, the present invention provides waveform synthesis methods for a shock response spectrum over a short time interval which comprise the steps of: (a) obtaining each time $\tau_k$ (k=1, 2, ..., M) at which a maximax value is detected in a shock response history due to a zero delay wavelet input, wherein a natural frequency of the SDOF system with a Q (quality factor) of 10 equals the wavelet frequency of the zero delay wavelet input; (b) and establishing each delay time $\delta_k$ as $\delta_k = \tau_1 - \tau_k$ (k=1, 2, ..., M).

Another embodiment of the present invention provides a digital filter for obtaining a shock response history required for waveform synthesis methods for the shock response spectrum over a short time interval, and there are coefficients of $P_1$ and $P_2$ in the difference equation of the unit pulse digital filter.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF INVENTION

Description will now be given in detail of the present invention, with reference to the accompanying drawings.

Hereinafter, with reference to FIGS. 2 through 17, the various aspect of the invention, will be explained in detail, i.e., a method for synthesizing waveforms for a shock response spectrum over a short time interval by establishing the delay time, number of half cycles, and acceleration amplitude of the wavelet which is a component waveform of a shock waveform, and a unit pulse digital filter for obtaining a shock response history.

The waveform synthesis method according to the present invention comprises the steps of: (a) obtaining each time $\tau_k$ (k=1, 2, ..., M) at which a maximax value is detected in a shock response history due to a zero delay wavelet input, wherein a natural frequency of a SDOF system with a Q of 10 is equal to the wavelet frequency of the zero delay wavelet input; and (b) and establishing each delay time $\delta_k$ as $\delta_k = \tau_1 - \tau_k$ (k=1, 2, ..., M).

Also, the waveform synthesis method according to the present invention may further comprise the steps of establishing the number of half cycles of the wavelet and establishing the acceleration amplitude of the wavelet.

The waveform synthesis method according to the present invention will be described in detail as follows.

A shock waveform is synthesized by taking wavelets as components. A wavelet refers to a half-sine modulated sinusoid with an odd number of half cycles as shown in Equation 1].

$$g(t) = A_0 \sin\frac{2\pi f_0 t}{N} \sin 2\pi f_0 t, \; 0 \leq t \leq \frac{N}{2f_0} \quad \text{[Equation 1]}$$

where $f_0$ refers to the wavelet frequency (it is actually the center frequency of the wavelet spectrum), N refers to the number of half cycles which is an odd number greater than 1, and $A_0$ refers to the wavelet acceleration amplitude.

The first two definite integrals are zero—hence no residual velocity or displacement if the wavelet represents an acceleration function.

A shock waveform x(t) for performing a shock response spectrum test can be expressed as a linear combination of wavelets as shown in [Equation 2].

$$x(t) = \sum_{k=1}^{M} g_k(t - \delta_k), \; \left(\text{here}, \; 0 \leq (t - \delta_k) \leq \frac{N_k}{2f_k}\right) \quad \text{[Equation 2]}$$

where $g_k(t-\delta_k)$ refers to the $k^{th}$ wavelet which has a delay time $\delta_k$, and M refers to the number of wavelets.

Also, the value $g_k(t-\delta_k)$ representing, the $k^{th}$ wavelet of delay time $\delta_k$ can be represented as shown in [Equation 3].

$$g_k(t-\delta_k) = A_k \sin\frac{2\pi f_k(t-\delta_k)}{N_k} \sin 2\pi f_k(t-\delta_k) \quad \text{[Equation 3]}$$

where $N_k$ refers to the number of half cycles in the $k^{th}$ wavelet, $A_k$ refers to the wavelet acceleration amplitude in the $k^{th}$ wavelet, and $f_k$ refers to the $k^{th}$ wavelet frequency which is represented as expressed in [Equation 4].

$$f_k = 2^n f_{k-1} \quad \text{[Equation 4]}$$

where, n refers to one-sixth (⅙), namely, six wavelet frequencies for each octave.

The wavelet frequency $f_k$ is calculated as the six wavelet frequencies for every octave from 2,000 Hz to about 10 Hz in their descending order, and the calculated frequencies are then assigned again in their ascending order.

The wavelet acceleration amplitude $A_k$ is repeatedly calculated in order to obtain the desired shock response spectrum with respect to the $k^{th}$ wavelet, which will be explained in detail later in relation to [Equation 8]

The number of the natural frequencies for the shock response spectrum analysis of the shock waveform may be given as six (6) for every octave from 2,000 Hz to about 10 Hz in a descending order. The given natural frequencies are then arranged in an ascending order. The shock waveform may be analyzed for the shock response spectrum with Q=10 at a sequence of natural frequencies spaced at an interval of one sixth octave (or one twelfth octave if necessary). The shock response spectrum has several types such as maximax, primary positive, primary negative, residual positive, residual negative or the like. However, test specifications generally accept the maximax, and thus the term shock response spectrum hereafter refers to the maximax type. Here, the maximax within specified time limits is referred to as a time limit shock response spectrum.

Methods for establishing the delay time, number of half cycles and acceleration amplitude of the wavelet will be explained as follows. First, for each wavelet k (here, k=1, 2, ..., M), a maximax value is obtained at the time $\tau_k$ in the response history of a SDOF system where a natural frequency of the SDOF system with a Q of 10 equals to the $k^{th}$ wavelet frequency and an input to the SDOF system is the $k^{th}$ wavelet with a delay time $\delta_k$=0, because a maximum value in the SRS due to the $k^{th}$ wavelet input with a delay time $\delta_k$=0 is easily found at the natural frequency which equals to the $k^{th}$ wavelet frequency. And then $\tau_1$ in $\tau_k$ (k=1, 2, ..., M) is the longest, because the numbers of half cycles are established as shown in [Equation 6]. Secondly, the delay time $\delta_k$ of the $k^{th}$ wavelet can be obtained according to [Equation 5]. For each wavelet k, each time $\Gamma_k$ is the same. Here, $\Gamma_k$ is the time at which a maximax value is obtained in the response history of a SDOF system where a natural frequency of the SDOF system equals to the $k^{th}$ wavelet frequency and an input to the SDOF system is the $k^{th}$ wavelet with a delay time $\delta_k$ as expressed in [Equation 5].

$$\delta_k = \tau_1 - \tau_k \text{ or, } \delta_k = \tau_1 - \tau_k + \text{const. } (k=1, 2, \ldots, M) \quad \text{[Equation 5]}$$

where const refers to a constant.

Also, the numbers of half cycles are established as expressed in [Equation 6].

$$N_k = \begin{cases} 5, \text{ (when } f_k < 1{,}000 \text{ Hz)} \\ 7, \text{ (when } f_k \geq 1{,}000 \text{ Hz)} \end{cases} \quad \text{[Equation 6]}$$

Furthermore, a method for obtaining and establishing the acceleration amplitude $A_k$ of the wavelet will be explained hereafter. An initial acceleration amplitude of each wavelet is given by −1 as in [Equation 7]. Here, the shock waveform synthesized by $A_k^1 = -1$ has an opposite direction to the waveform synthesized by $A_k^1 = 1$.

$$A_k^1 = -1 \ (k=1, 2, \ldots, M) \quad \text{[Equation 7]}.$$

In the $i^{th}$ shock waveform synthesis, the acceleration amplitude $A_k^i$ of the $k^{th}$ wavelet is obtained by iterating [Equation 8].

$$A_k^{i+1} = \frac{R_k}{S_k^i} A_k^i \text{ or } A_k^{i+1} = \frac{R_k}{C_k^i} A_k^i \quad \text{[Equation 8]}$$

where $R_k$ refers to a shock response spectrum required by the test specification, i.e., the peak response of a series of SDOF systems (each with the $k^{th}$ natural frequency), $S_k^i$ refers to a shock response spectrum of the $i^{th}$ synthesized shock waveform, and $C_k^i$ refers to a time limit shock response spectrum representing the shock response spectrum detected within specified time limits. Here, Q=10, and the sequence of natural frequencies have a one sixth octave interval in the range of 10 Hz to 2,000 Hz or of 20 Hz to 2,000 Hz. Here, Q is referred to as a quality factor value, namely, the so-called transmissibility at resonance.

The shock waveform for the shock response spectrum over a short time interval can be obtained from the linear combination of wavelets where the parameters of wavelets such as delay time, number of half cycles and acceleration amplitude are established according to the present invention.

Hereinafter, a method will be explained for providing a unit pulse digital filter for calculating the shock response histories and the shock response spectra which are used for synthesizing waveforms according to the present invention.

The unit pulse digital filter can be easily embodied from the view of those skilled in the art by using its difference equation, and thus a method for obtaining the difference equation of the unit pulse digital filter will be explained hereafter.

Considering that the input to the SDOF is the base acceleration and that the response of the system is the absolute acceleration of the mass, then the transfer function of this system in the complex Laplace domain is given by [Equation 9].

$$H(s) = \frac{Y(s)}{X(s)} = \frac{2\zeta W_n s + W_n^2}{s^2 + 2\zeta W_n s + W_n^2} = \frac{2cs + W_n^2}{s^2 + 2cs + W_n^2} \quad \text{[Equation 9]}$$

where $$W_n = 2\pi f_n, \zeta = \frac{1}{2Q}, c = \zeta W_n,$$

$f_n$ is the natural frequency and Q is a quality factor value.

By taking the difference between two step functions, a unit pulse is formed of unit amplitude from t=0 to t=T as given by [Equation 10] where T is the sampling period and x(t) represents the input acceleration. The z-transform of x(t) is given, by [Equation 11] and the Laplace transform of x(t) is given by [Equation 12]. Also, the Laplace transform of y(t) is given by [Equation 13] wherein y(t) represents the output acceleration. The inverse Laplace transform of Y(s) is expressed by [Equation 14], and the z-transform Y(z) is expressed by [Equation 15].

$$L^{-1}[X(s)] = x(t) = U(t) - U(t-T) \qquad \text{[Equation 10]}$$

$$X(z) = \frac{z}{z-1} - \frac{1}{z-1} = 1 \qquad \text{[Equation 11]}$$

$$L[x(t)] = X(s) = \frac{1}{s} - e^{-Ts}\frac{1}{s} \qquad \text{[Equation 12]}$$

$$L[y(t)] = Y(s) = \left(\frac{1}{s} - e^{-Ts}\frac{1}{s}\right)\frac{2cs + W_n^2}{s^2 + 2cs + W_n^2} = \qquad \text{[Equation 13]}$$

$$\frac{1}{s} - \frac{(s+c) - \frac{c}{W_d}W_d}{(s+c)^2 + W_d^2} - e^{-Ts}\left(\frac{1}{s} - \frac{(s+c) - \frac{c}{W_d}W_d}{(s+c)^2 + W_d^2}\right)$$

$$y(t) = L^{-1}[Y(s)] = \qquad \text{[Equation 14]}$$
$$U(t) - e^{-ct}\left(\cos W_d t - \frac{c}{W_d}\sin W_d t\right)U(t) - \left[U(t-T) - e^{-c(t-T)}\left(\cos W_d(t-T) - \frac{c}{W_d}\sin W_d(t-T)\right)U(t-T)\right] =$$
$$U(t) - U(t-T) - e^{-ct}\left(\cos W_d t - \frac{c}{W_d}\sin W_d t\right)U(t) + e^{-c(t-T)}\left(\cos W_d(t-T) - \frac{c}{W_d}\sin W_d(t-T)\right)U(t-T)$$

$$Y(z) = 1 - \frac{z^2 - ze^{-cT}\left(a + \frac{bc}{W_d}\right) - z + e^{-cT}\left(a + \frac{bc}{W_d}\right)}{z^2 - 2zae^{-cT} + e^{-2cT}} = \qquad \text{[Equation 15]}$$

$$1 - \frac{z^2 - z\left[e^{-cT}\left(a + \frac{bc}{W_d}\right) + 1\right] + e^{-cT}\left(a + \frac{bc}{W_d}\right)}{z^2 - 2zae^{-cT} + e^{-2cT}} =$$

$$\frac{z\left[e^{-cT}\left(a + \frac{bc}{W_d} - 2a\right) + 1\right] - e^{-cT}\left(a + \frac{bc}{W_d} - e^{-cT}\right)}{z^2 - 2zae^{-cT} + e^{-2cT}} =$$

$$\frac{ze^{-cT}\left(e^{cT} - a + \frac{bc}{W_d}\right) - e^{-2cT}\left[\left(a + \frac{bc}{W_d}\right)e^{cT} - 1\right]}{z^2 - 2zae^{-cT} + e^{-2cT}}$$

where $W_d = W_n\sqrt{1-\zeta^2}$, $a = \cos(W_d T)$, and $b = \sin(W_d T)$.

At this time, $P_1$, $P_2$, $Q_1$, and $Q_2$ can be expressed as in [Equation 16], provided that the z-transform Y(z) of y(t) is set by $$Y(z) = \frac{P_1 z + P_2}{z^2 - Q_1 z - Q_2}. \qquad \text{[Equation 16]}$$

$$P_1 = e^{-cT}\left(e^{cT} - a + \frac{bc}{W_d}\right),$$

$$P_2 = -e^{-2cT}\left[\left(a + \frac{bc}{W_d}\right)e^{cT} - 1\right],$$

$$Q_1 = 2ae^{-cT}, \quad Q_2 = e^{-2cT}$$

Consider that a discrete data system is described by the difference equation as given by [Equation 17]. Taking the z-transform on both sides of the equation and assuming zero initial conditions yields [Equation 18]. From the equation the transfer function of the system is easily focused as in [Equation 19]. This system (hereinafter referred to as "unit pulse digital filter") can be realized by the difference equation as given by [Equation 20] where $X_1=X_2=0$, $Y_1=Y_2=0$ and $k \geq 3$.

$$Y_{k+2} - Q_1 Y_{k+1} - Q_2 Y_k = P_1 X_{k+1} + P_2 X_k \qquad \text{[Equation 17]}$$

$$z^2 Y(z) - Q_1 z Y(z) - Q_2 Y(z) = P_1 z X(z) + P_2 X(z) \qquad \text{[Equation 18]}$$

$$H(z) = \frac{Y(z)}{X(z)} = \frac{P_1 z + P_2}{z^2 - Q_1 z - Q_2} = \frac{P_1 z^{-1} + P_2 z^{-2}}{1 - Q_1 z^{-1} - Q_2 z^{-2}} \qquad \text{[Equation 19]}$$

$$Y_k = Q_1 Y_{k-1} + Q_2 Y_{k-2} + P_1 X_{k-1} + P_2 X_{k-2} \qquad \text{[Equation 20]}$$

Figure 2:
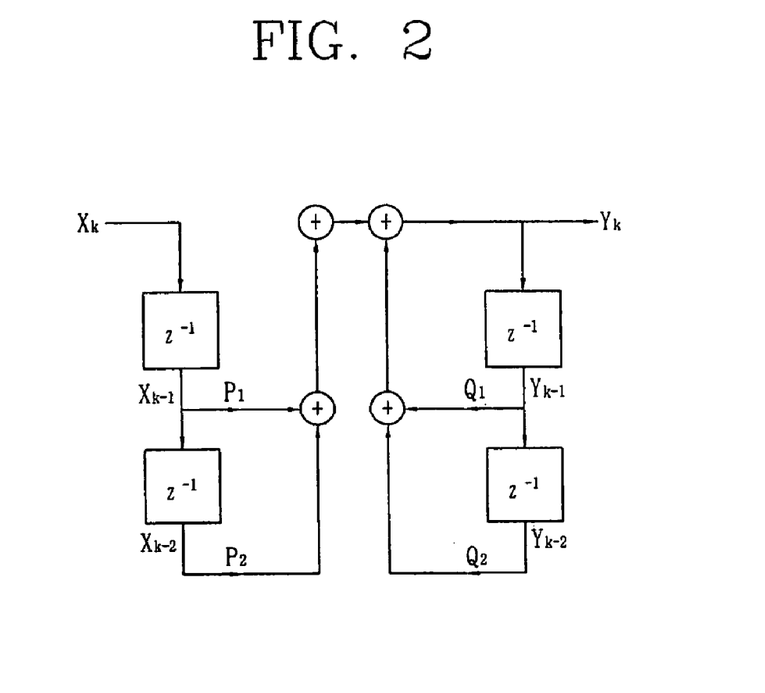
FIG. 2 is a block diagram of a digital filter which may be realizing employed in the method according to the present invention.

FIG. 2 shows a block diagram of the unit pulse digital filter according to the present invention. According to the present invention, an inverse filter of the unit pulse digital filter (hereinafter referred to as "unit pulse digital inverse filter") which is used in order to filter off the unwanted transient can be obtained as follows.

The transfer function $M_z(z)$ of the unit pulse digital inverse filter is given by [Equation 21].

$$M_z(z) = \frac{1}{H(z)} = \frac{X(z)}{Y(z)} \qquad \text{[Equation 21]}$$

Letting $X^s(z) = z^{-1} X(z)$, then $X_k^s = X_{k-1}$ is obtained by a right shift in time. So the transfer function of the typical recursive filter will be obtained as in [Equation 22]. The difference equation of the unit pulse digital inverse filter is given by [Equation 23].

$$\frac{X^s(z)}{Y(z)} = \frac{z^{-1} X(z)}{Y(z)} = \qquad \text{[Equation 22]}$$

$$\frac{z^2 - Q_1 z - Q_2}{P_1 z^2 + P_2 z} = \frac{b_0 + b_1 z^{-1} + b_2 z^{-2}}{1 + a_1 z^{-1}}$$

$$X_k^s = b_0 Y_k + b_1 Y_{k-1} + b_2 Y_{k-2} - a_1 X_{k-1}^s$$

or, $$X_{k-1} = b_0 Y_k + b_1 Y_{k-1} + b_2 Y_{k-2} - a_1 X_{k-2} \qquad \text{[Equation 23]}$$

Here, $$a_1 = \frac{P_2}{P_1}, \ b_0 = \frac{1}{P_1}, \ b_1 = \frac{-Q_1}{P_1}, \ b_2 = \frac{-Q_2}{P_1},$$

and, $$3 \leq k \leq N,$$

Figure 3:
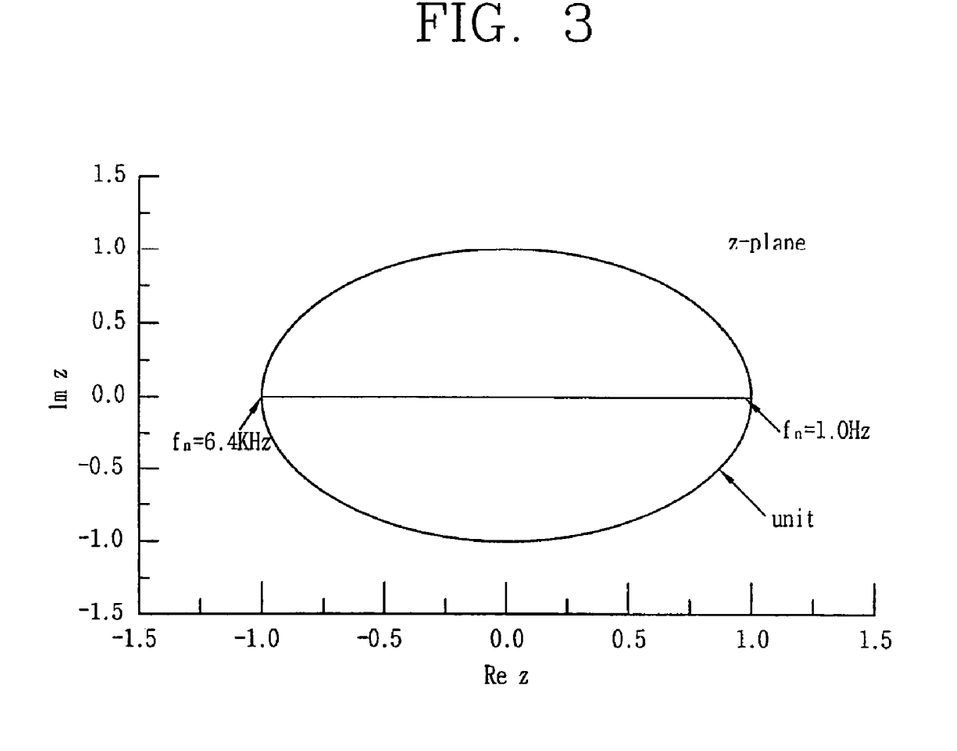
FIG. 3 is plot showing z-plane pole locations for a unit pulse digital inverse filter.

$X_1 = X_2 = X_N = 0$, $Y_1 = Y_2 = 0$. At this time, when $|a_1| < 1$, the system may b sufficiently stable to be embodied. FIG. 3 shows z-plane pole locations for the unit pulse digital inverse filter in order to check whether or not the system is stable.

Here, pole locations are obtained with the sampling period $T = 7.8125 \times 10^{-5}$ sec in the single degree of freedom systems in which the natural frequency is $1.0 \text{ Hz} \leq f_n \leq 6.4$ KHz at an interval of 1.0 Hz and Q=10.

As shown in FIG. 3, the unit pulse digital inverse filter is stable, and thus is available to be used for filtering off the unwanted transients.

Figure 4:
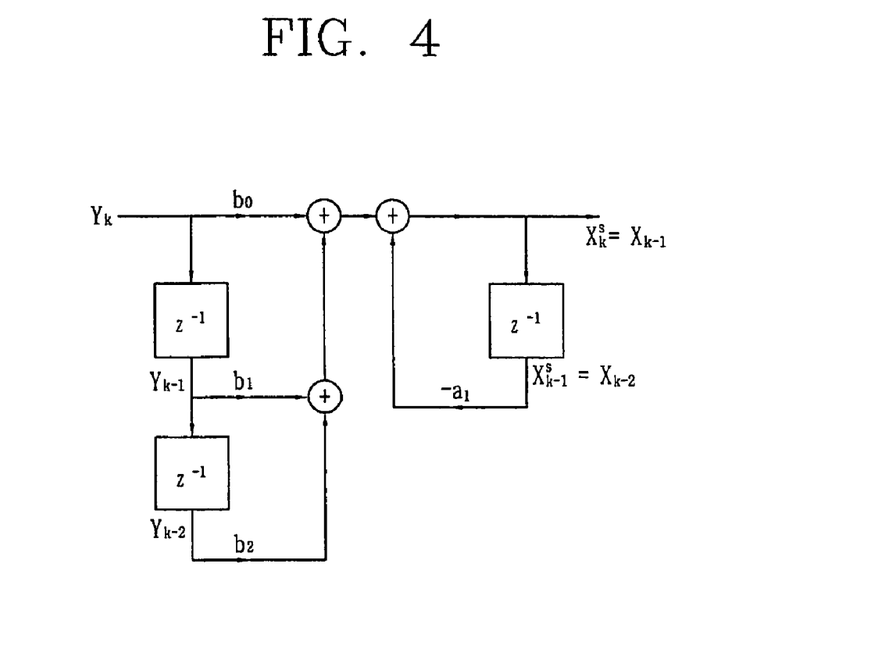
FIG. 4 is a block diagram of a digital inverse filter which may be employed in realizing the method according to the present invention.

A block diagram showing the digital inverse filter obtained according to the present invention is displayed in FIG. 4.

The unit pulse digital inverse filter is devised to filter off the unwanted transients included in the measured data in the circumstances where it is possible to measure only outputs through the structure (e.g. where an output transmitted through a test stand (structure) is measured by a load cell for evaluating the thrust of a rocket motor).

Hereinafter, it will be considered with reference to the accompanying drawings whether the shock waveforms synthesized according to the present invention satisfy specifications of the shock response spectrum test of the functional test for flight equipment, the functional test for ground equipment, the crash hazard test for flight equipment, and the crash hazard test for ground equipment, being those which are generally used, for the shock test.

Figure 5:
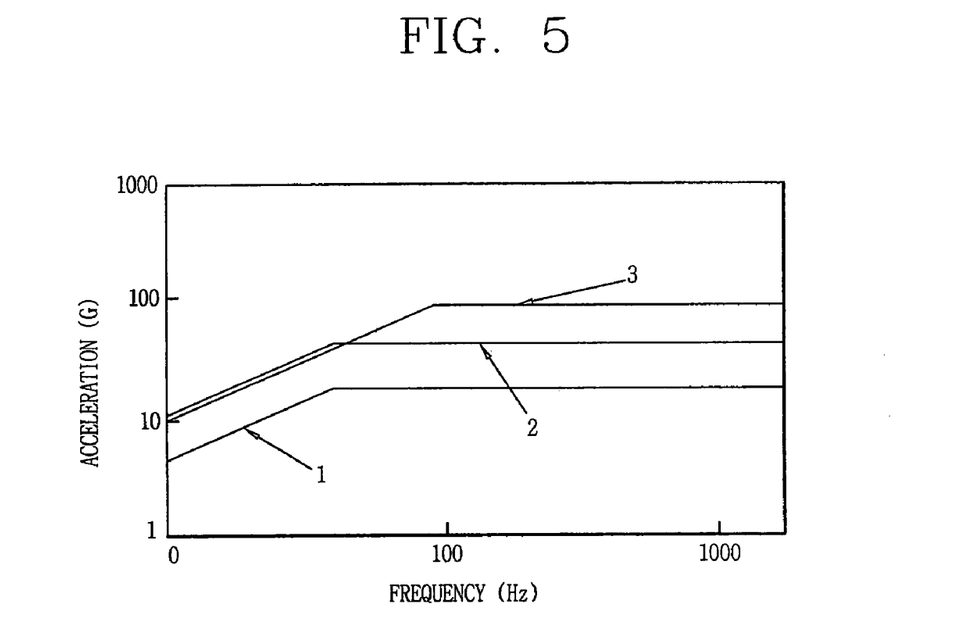
FIG. 5 is a graph which shows of test shock response spectra of a functional test for flight equipment, a functional test for ground equipment and crash hazard test for flight equipment, and crash hazard test for ground equipment.

FIG. 5 shows specifications of test shock response spectra for ground equipment and flight equipment. Therefore, the shock response spectrum of a certain shock waveform should satisfy the specification shown in FIG. 5. In FIG. 5, the reference numeral 1 designates the specification of the shock response spectrum to be applied for the functional test for flight equipment, the reference numeral 2 designates the specification of the shock response spectrum to be applied for the functional test for ground equipment and the crash hazard test for flight equipment, and the reference numeral 3 designates the specification of the shock response spectrum to be applied for the crash hazard test for ground equipment. Here, an effective shock duration should satisfy the specified conditions in the test shock time history.

Figure 6:
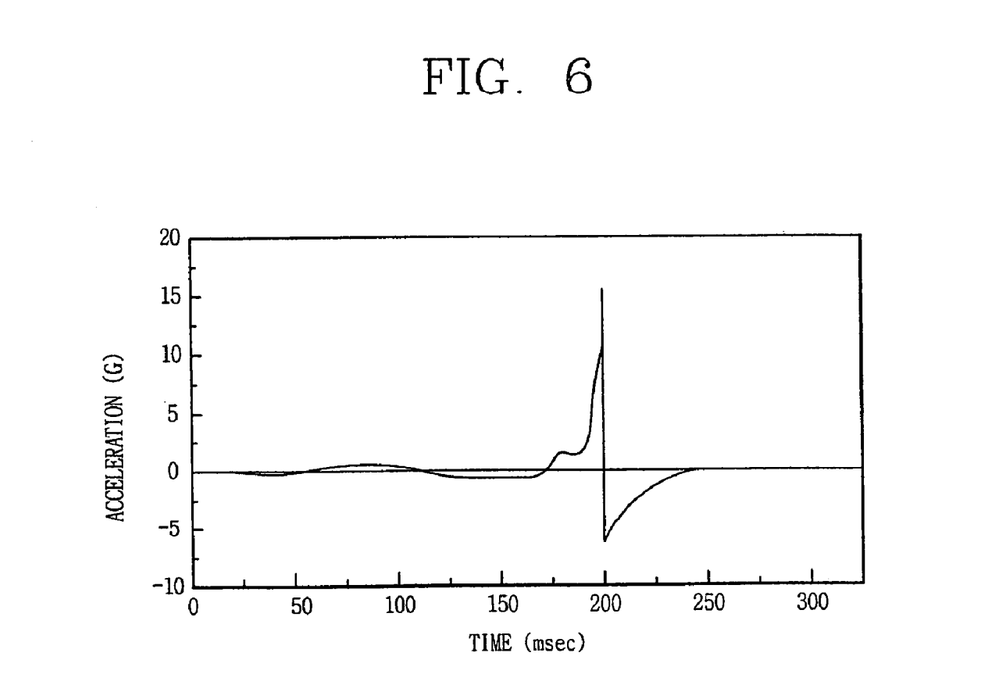
FIG. 6 is a graph showing a shock waveform synthesized according to the present invention in order to perform the functional test for flight equipment.

FIG. 6 is a graph showing a shock waveform synthesized according to the present invention in order to perform the functional test for flight equipment.

Figure 7:
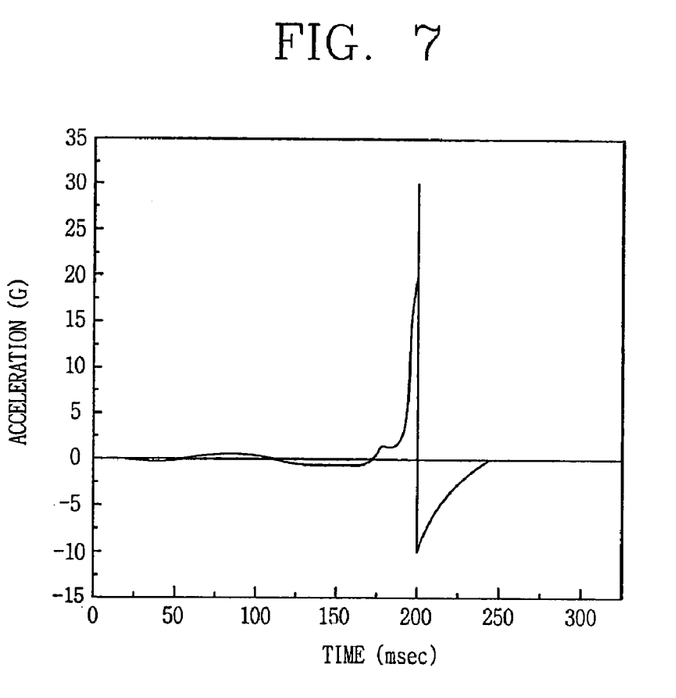
FIG. 7 is a graph showing a shock waveform synthesized according to the present invention in order to perform the functional test for ground equipment and crash hazard test for flight equipment.

FIG. 7 is a graph showing a shock waveform synthesized according to the present invention in order to perform the functional test for ground equipment and the crash hazard test for flight equipment.

Figure 8:
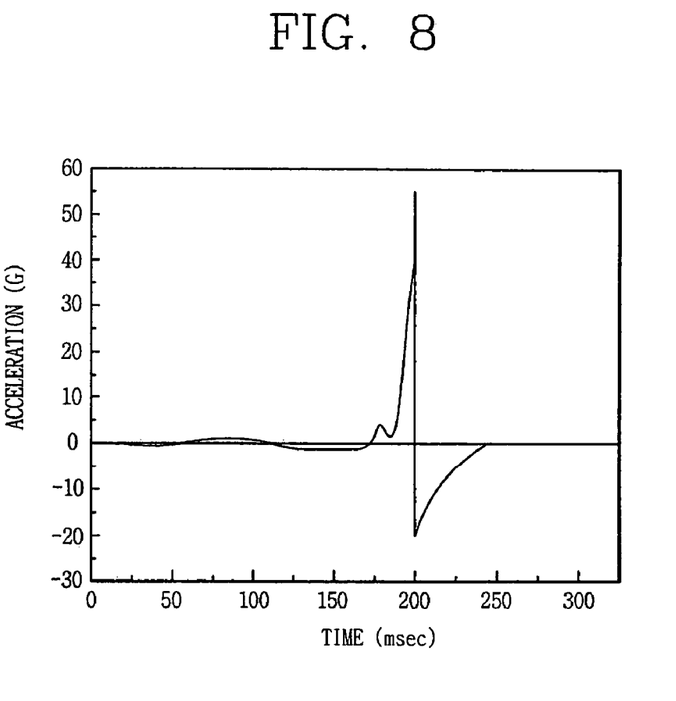
FIG. 8 is a graph showing a shock waveform synthesized according to the present invention in order to perform the crash hazard test for ground equipment.

FIG. 8 is a graph showing a shock waveform synthesized according to the present invention in order to perform the crash hazard test for ground equipment.

Figure 9:
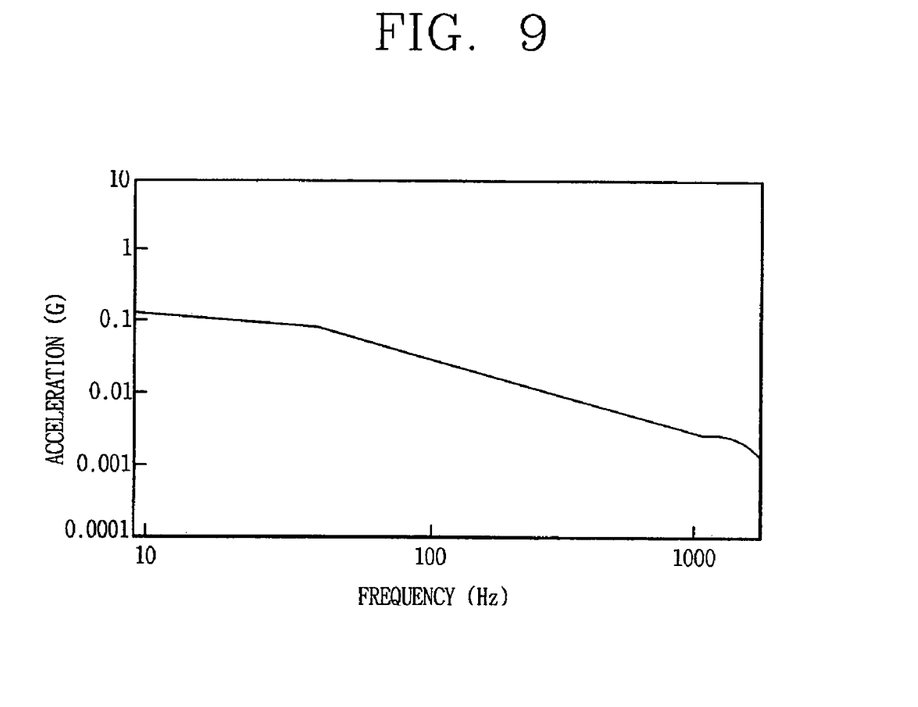
FIG. 9 is a graph which shows a Fourier spectrum of a shock waveform synthesized according to the present invention in order to perform the functional test for flight equipment.

FIG. 9 shows a Fourier spectrum of a shock waveform synthesized according to the present invention in order to perform the functional test for flight equipment.

Figure 10:
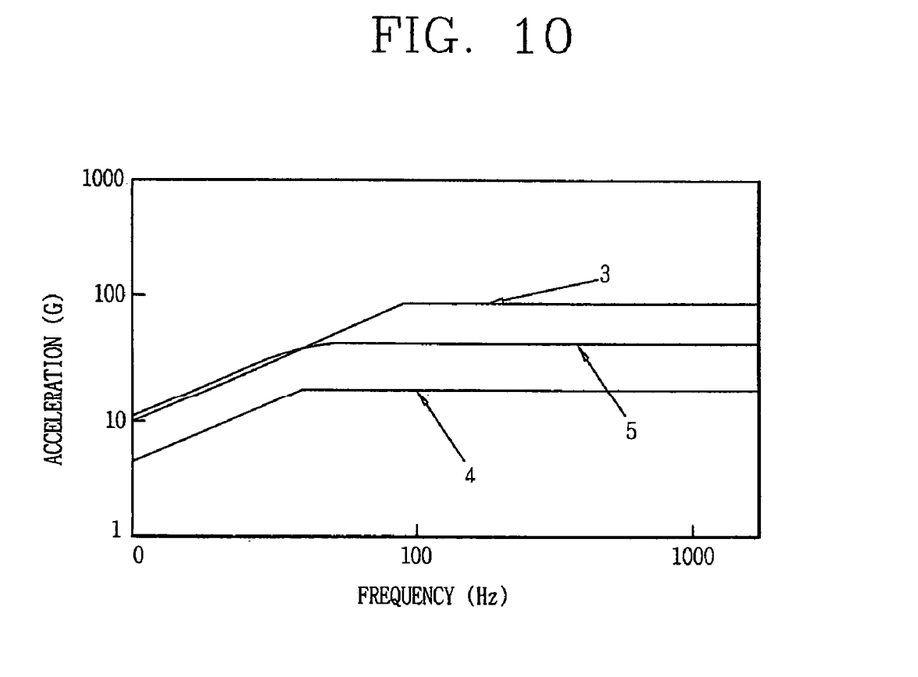
FIG. 10 is a graph which shows shock response spectra of FIGS. 6 to 8.

FIG. 10 shows shock response spectra of FIGS. 6 to 8.

Therefore, as shown in FIG. 9, the Fourier spectrum of the waveform synthesized according to the present invention is a smooth curve without harsh notches compared with the conventional art, so the quality of the synthesized waveform is superior to that of the conventional synthesized waveform. Also, comparing FIG. 5 with FIG. 10, since those graphs approximately correspond, it can be recognized that the shock waveform synthesis method for the shock response spectrum over a short time interval in accordance with the invention satisfies the test specifications.

Furthermore, it will now be explained whether the synthesis method according to the present invention further increases interference between parts within a test specimen.

Figure 11:
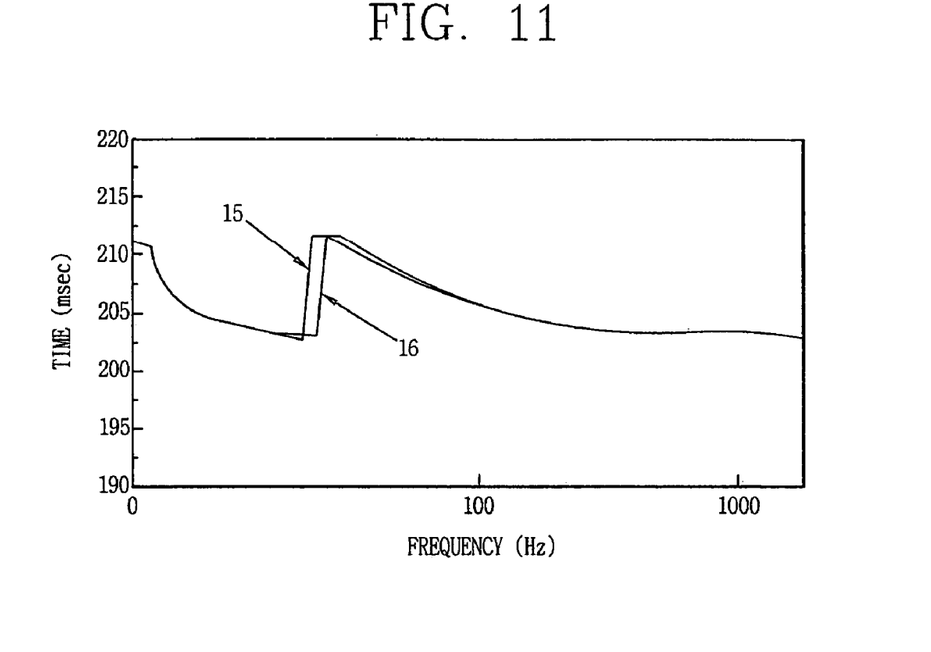
FIG. 11 is a graph which shows in a domain of natural frequencies the time at which the time limit shock response spectra of FIGS. 6 to 8 are detected.

First, the time limit shock response spectra of FIGS. 6 to 8 are within the −3 dB tolerance limit where a time limit shock response spectrum is a plot of maximax responses within 16 msec time limits (from 195 msec to 211 msec) in the shock response time histories. FIG. 11 shows in a domain of natural frequencies the time at which the time limit shock response spectra of FIGS. 6 to 8 are detected where the time limits is 16 msec (from 195 msec to 211 msec). Here, reference numeral 15 designates the time at which the time limit shock response spectra are detected in the cases of a waveform (FIG. 6) synthesized for the functional test for flight equipment and a waveform (FIG. 7) synthesized for the functional test for ground equipment and the crash hazard test for flight equipment, and the reference numeral 16 designates the time at which the time limit shock response spectrum is detected in the case of a waveform (FIG. 8) synthesized for the crash hazard test for ground equipment.

With reference to FIG. 11, since the time at which the time limit shock response spectrum is obtained is between 201 msec and 211 msec (which means the time difference is 10 msec), such 10 msec time difference is very short so that the interference between parts within the test specimen may be sufficiently checked, considering that more than −3 dB acceleration occurs between 201 msec and 211 msec in the response history of each SDOF system.

In addition, it can be checked whether the method for obtaining an acceleration amplitude according to the present invention is feasible.

First, similarly, a time limit shock response spectrum is obtained with 16 msec time limits (from 195 msec to 211 msec) in the shock response time histories, and shock waveforms are synthesized to satisfy the test specifications of the shock response spectra shown in FIG. 5 by the time limit shock response spectrum. That is, in order to obtain the wavelet acceleration amplitude, the shock waveforms satisfying the test specifications of the shock response spectra shown in FIG. 5 are synthesized by using $C_k^i$ during the process of iterating [Equation 8].

Figure 12:
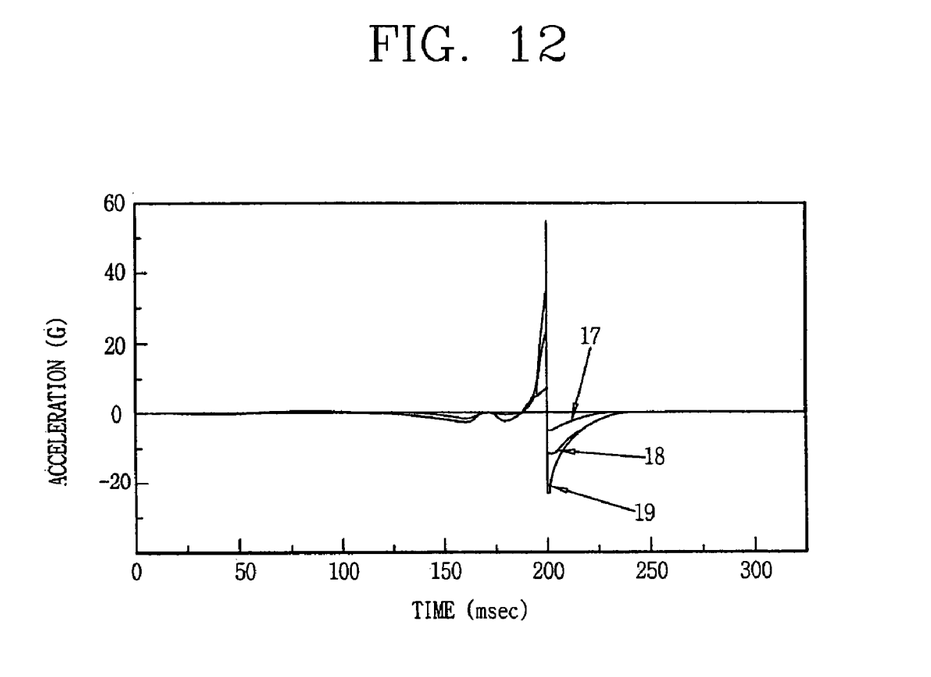
FIG. 12 is a graph which shows waveforms synthesized by using the time limit shock response spectrum for the test specifications shown in FIG. 5.

FIG. 12 shows the shock waveforms synthesized by using the time limit shock response spectrum $C_k^i$ per [Equation 8] and it can be seen therefrom that these waveforms satisfy the specifications for the shock response spectrum test shown in FIG. 5.

Figure 13:
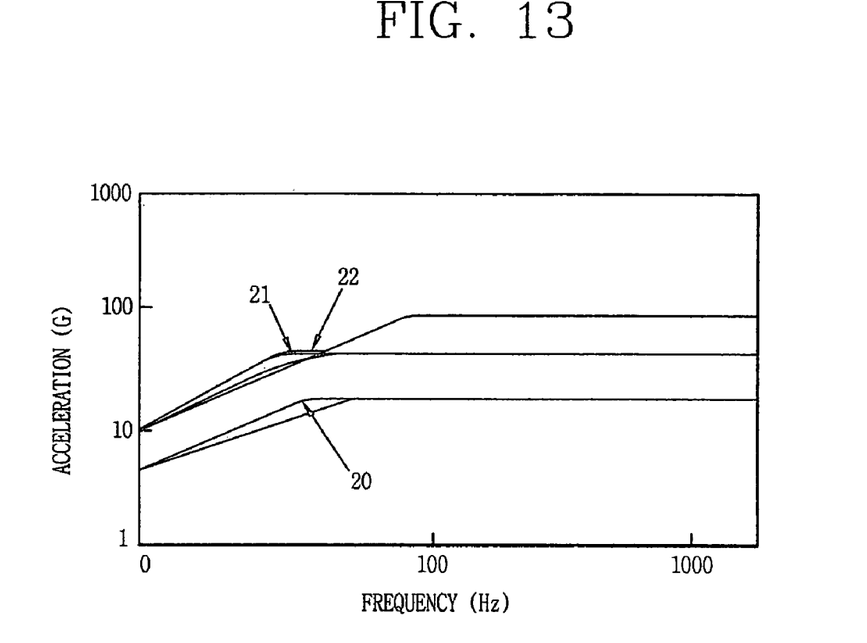
FIG. 13 is a graph which shows shock response spectra of the synthesized waveforms shown in FIG. 12.

FIG. 13 shows the shock response spectra of the shock waveforms shown in FIG. 12.

FIG. 13 shows shock response spectra of the synthesized waveforms shown in FIG. 12.

In FIG. 12, the reference numeral 17 designates a shock waveform synthesized by using the time limit shock response spectrum for the functional test for flight equipment, the reference numeral 18 designates a shock waveform synthesized by using the time limit shock response spectrum for the functional test for ground equipment and the crash hazard test for flight equipment, and the reference numeral 19 designates a shock waveform synthesized by using the time limit shock response spectrum for the crash hazard test for ground equipment. In FIG. 13, the reference numeral 20 designates the shock response spectrum of the waveform designated at 17 in FIG. 12, the reference numeral 21 designates the shock response spectrum of the waveform designated at 18 in FIG. 12, and the reference numeral 22 designates the shock response spectrum of the numeral waveform designated at 19 in FIG. 12.

As can be seen in FIG. 13, the shock response spectra are within the 3 dB tolerance limit. Similarly, considering that the acceleration required by the test specification is between 201 msec and 211 msec in the response history of each SDOF system, the 10 msec time difference is very short so as to check the interference between parts within the test item.

Next, it will be explained with reference to the accompanying drawings what effect the waveform synthesis method according to the present invention can obtain in the classic shock test such as half-sine or sawtooth.

Figure 14:
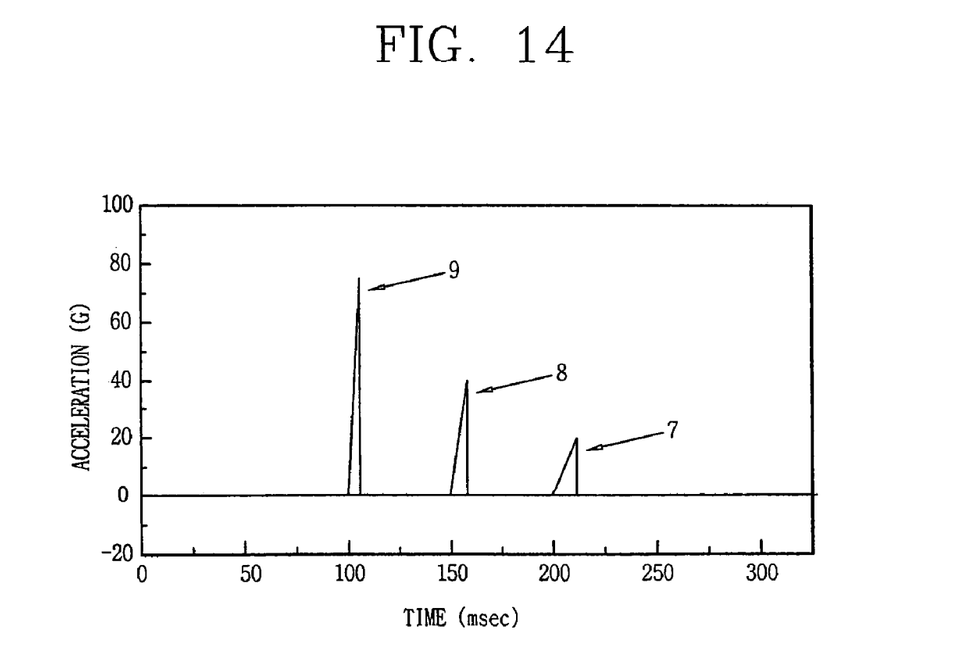
FIG. 14 is a graph which shows ideal sawtooth waveforms for functional test for flight equipment, functional test for ground equipment and crash hazard test for flight equipment, and crash hazard test for ground equipment.

In the classic shock test, sawtooth waveforms as shown in FIG. 14 are used for the functional test for flight equipment, the functional test for ground equipment, the crash hazard test for flight equipment and the crash hazard test for ground equipment. The shock response spectra of the sawtooth waveforms are shown in FIG. 15.

FIG. 14 shows idealized sawtooth waveforms for the functional test for flight equipment, the functional test for ground equipment, the crash hazard test for flight equipment and the crash hazard test for ground equipment.

Figure 15:
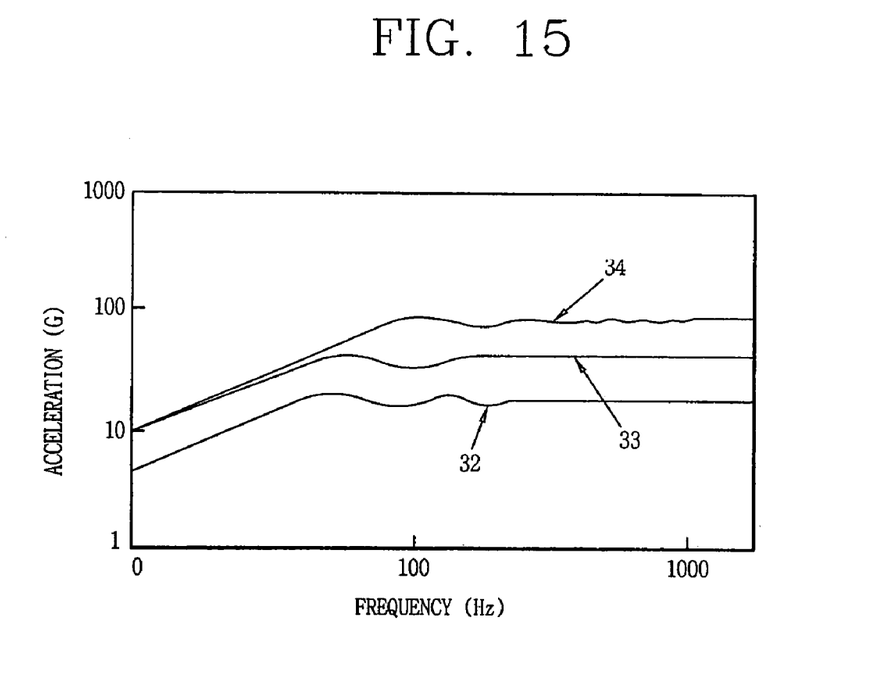
FIG. 15 is a graph which shows shock response spectra of the sawtooth waveforms shown in FIG. 14.

FIG. 15 shows the shock response spectra of the sawtooth waveforms of FIG. 14. Here, the reference numerals 7 and 32 respectively designate the waveform and spectrum related to the functional test for flight equipment, the reference numerals 8 and 33 related to the functional test for ground equipment and the crash hazard test for flight equipment, and the reference numerals 9 and 34 related to the crash hazard test for ground equipment.

Figure 16:
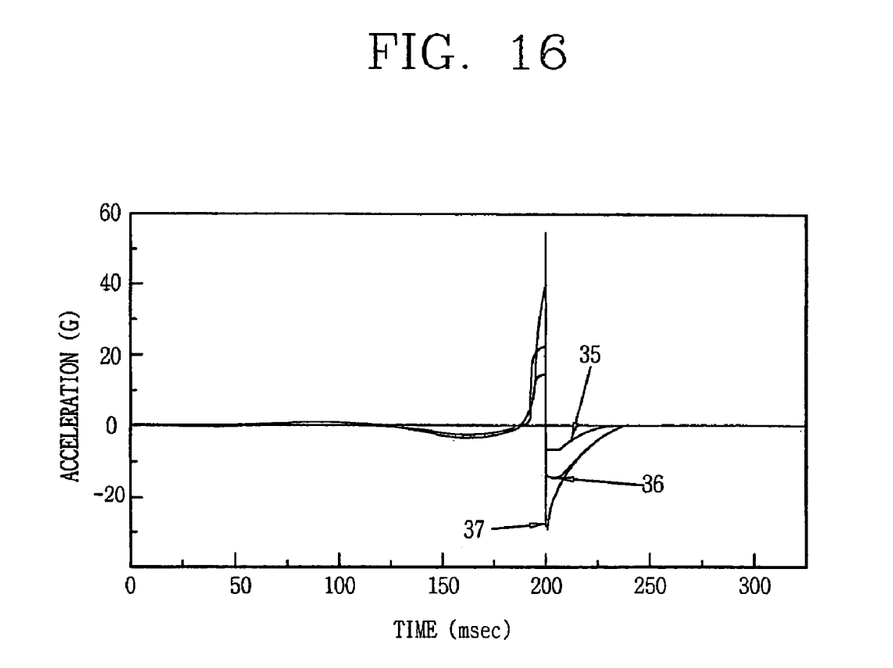
FIG. 16 is a graph which shows waveforms synthesized according to the present invention with the shock response spectra shown in FIG. 15 for the shock test shown in FIG. 14.
Figure 17:
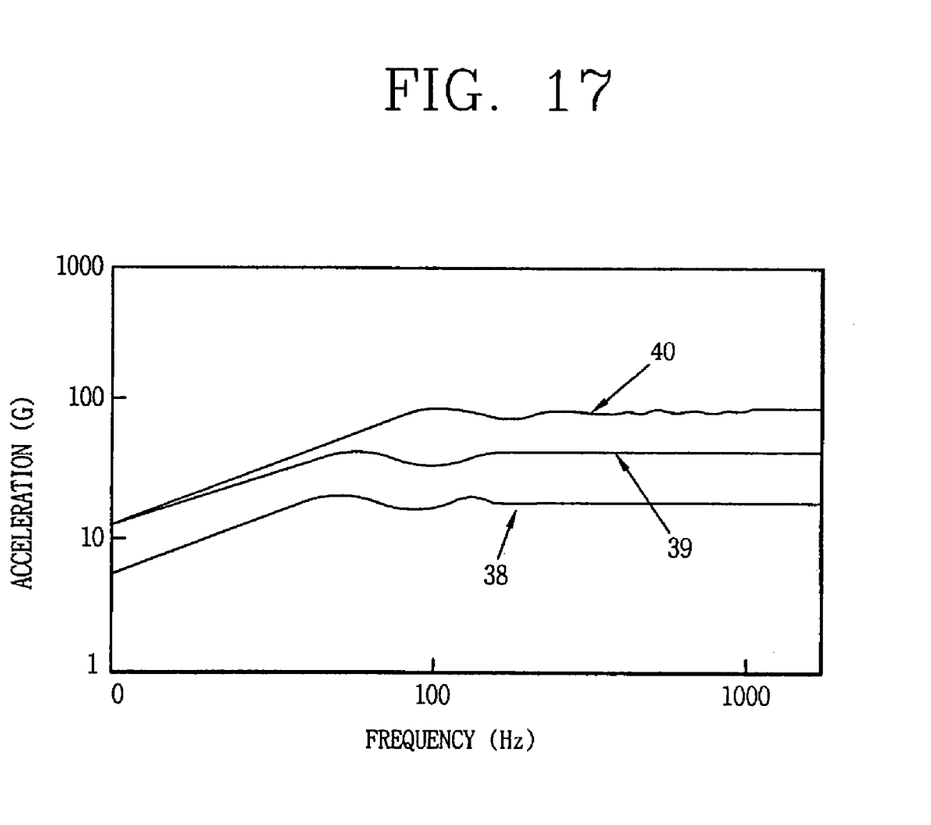
FIG. 17 is a graph which shows shock response spectra of the synthesized waveforms shown in FIG. 16.

In order to use the shock response spectra of FIG. 15 for the shock test, waveforms synthesized according to the present invention are shown in FIG. 16, and the shock response spectra of the synthesized waveforms are shown in FIG. 17. Here, the reference numerals 35 and 38 respectively designate the waveform and spectrum related to the functional test for flight equipment, the numerals reference 36 and 39 respectively designate the waveform and spectrum related to the functional test for ground equipment and the crash hazard test for flight equipment, and the reference numerals 37 and 40 respectively designate the waveform and spectrum related to the crash hazard test for ground equipment.

Therefore, as can be seen from FIGS. 15 and 17, the shock waveforms synthesized according to the present invention can be used for the shock test, instead of using the sawtooth waveforms which have pre-load and post-load with respect to the test specifications for the sawtooth waveforms for the classic shock test. Furthermore, the waveforms are synthesized by using wavelets of which the frequency is 20~2,000 Hz, and the shock response spectrum with respect to the natural frequency of 20~2,000 Hz is analyzed. As a result, peak velocities and peak displacements can be further reduced, and accordingly it can be advantageous to overcome the problem of the test being impossible to perform when the peak velocities and/or the peak displacements exceed shaker limits.

As described above, by increasing the interference between parts within the test specimen, the shock test can be sufficiently performed with respect to the damage or malfunction which may be caused by the interference, and the shock response history required for the synthesis of the shock waveforms can be obtained according to the present invention. Also, the unwanted transients can be filtered off, and the peak velocities and the peak displacements in the classic shock test of the sawtooth or half-sine can be easily reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of conducting a shock response spectrum test on a piece of equipment, the method comprising:
  establishing a plurality of wavelets, each wavelet having a wavelet frequency and having a delay time;
  synthesizing the plurality of wavelets to form a shock waveform;
  conducting the shock response spectrum test on the piece of equipment using the shock waveform; and
  wherein each wavelet delay time $\delta_k$ is established as $\delta_k = \tau_1 - \tau_k$ (k=1, 2, ..., M), wherein each time $\tau_k$ is determined by:
  determining a transfer function for a single degree of freedom (SDOF) system, wherein the SDOF system has a quality factor of 10, and wherein a natural frequency of the SDOF system is equal to the wavelet frequency;
  determining a shock response history for the SDOF system due to a zero delay wavelet input having the wavelet frequency; and
  obtaining the time $\tau_k$ at which a maximax value is detected in the shock response history.

2. The method of claim 1 wherein establishing the plurality of wavelets further comprises:
  establishing a number of half cycles for each wavelet.

3. The method of claim 2 wherein establishing the plurality of wavelets further comprises:
  establishing an acceleration amplitude for each wavelet.

4. The method of claim 3 wherein the number of half cycles for a wavelet is 5 when the wavelet frequency is under 1,000 Hz; otherwise, the number of half cycles is 7.

5. The method of claim 3 wherein the acceleration amplitude for each wavelet is established by specifying a time limit and obtaining the maximax value within the time limit.

* * * * *